United States Patent [19]

Cripe

[11] Patent Number: 4,812,340

[45] Date of Patent: Mar. 14, 1989

[54] SIMULATED DESERT VARNISH PRODUCTS AND METHODS OF MAKING SAME

[76] Inventor: Jerry D. Cripe, 2445 S. Catarina, Mesa, Ariz. 85202

[21] Appl. No.: 142,423

[22] Filed: Jan. 11, 1988

Related U.S. Application Data

[60] Division of Ser. No. 828,142, Feb. 7, 1986, Pat. No. 4,725,451, which is a continuation of Ser. No. 762,794, Aug. 2, 1985, abandoned, which is a continuation of Ser. No. 689,501, Jan. 8, 1985, abandoned, which is a continuation of Ser. No. 598,394, Apr. 9, 1984, abandoned, which is a continuation of Ser. No. 517,468, Jul. 26, 1983, abandoned, which is a continuation of Ser. No. 418,556, Sep. 15, 1982, abandoned, which is a continuation of Ser. No. 071,506, Aug. 31, 1979, abandoned, which is a continuation of Ser. No. 865,455, Dec. 29, 1977, abandoned.

[51] Int. Cl.$^4$ ................................................ B05C 1/16
[52] U.S. Cl. ........................................ 428/15; 156/61
[58] Field of Search ................ 156/61; 427/136, 140, 427/267, 301, 343, 419.1; 428/13, 15

[56] References Cited

U.S. PATENT DOCUMENTS

| | | | |
|---|---|---|---|
| 3,955,018 | 5/1976 | Liberto et al. | 428/16 |
| 4,082,871 | 4/1978 | Peters | 428/15 |
| 4,725,451 | 2/1988 | Cripe | 427/136 |

OTHER PUBLICATIONS

Hunt, "Desert Varnish," Science, vol. 120, pp. 183-184 (1954).
Engel et al., "Chemical Data on Desert Varnish," Bull. Geol. Soc. Amer., vol. 69, No. 5, pp. 487-518 (1968).
Hem., "Deposition & Solution of Manganese Oxides," U.S. Geol. Survey Water Supply, Paper 1667-B, pp. B1-B41 (1963).
Krauskopf, "Separation of Manganese from Iron in Sedimentary Process," Grochem, Cosmochim, Acta, vol. 12, pp. 61-84 (1957).

*Primary Examiner*—Henry F. Epstein
*Attorney, Agent, or Firm*—Charles E. Cates

[57] ABSTRACT

The disclosure relates to a composition of matter comprising a rock substrate having a coating simulating natural desert varnish which can be developed within a few days, as contrasted to natural desert varnish which requires at least decades to develop in nature. The coating comprises an initial layer of the reaction product of the rock substrate with a solution of an alkali base and a finishing cover comprising the reaction product of the initial layer with a solution of a metallic salt. Optionally, the coating can include an additional covering of sodium hypochlorite.

8 Claims, No Drawings

SIMULATED DESERT VARNISH PRODUCTS AND METHODS OF MAKING SAME

This application is a division of copending application Ser. No. 828,142 filed 02/07/86, now U.S. Pat. No. 4,725,451, which is a continuation of application Ser. No. 06/762,794 filed 08/02/85, now abandoned, which is a continuation of Ser. No. 06/689,501, filed 01/08/85, now abandoned, which is a continuation of Ser. No. 06/598,394, filed 04/09/84, now abandoned, which is a continuation of application Ser. No. 06/517,468 filed 07/26/83, now abandoned, which is a continuation of application Ser. No. 06/418,556 filed 09/15/82, now abandoned, which is a continuation of Ser. No. 06/071,506, filed 08/31/79, now abandoned, which is a continuation of Ser. No. 05/865,455 filed 12/29/77, now abandoned, each continuation having been co-pending with each predecessor application.

BACKGROUND OF THE INVENTION

This invention is a method of simulating in a very short time the desert varnish produced by nature over decades and longer periods of time. The invention further relates to articles of manufacture simulating the surface appearance of natural desert varnish.

Much of the desert areas, both valleys and mountains, found in arid and semi-arid regions of the United States and other parts of the world are covered by a thin coating of generally dark coloration. For example, in the Southern California and Arizona deserts the varnish covers seventy-five percent (75%) of the coherent-stable rock surface including mountain ranges. In some areas of Southern California it has been demonstrated that desert varnish may be formed within twenty-five years after exposure of fresh rock. However, in other areas, such as Arizona, petroglyphs documented to have been formed four hundred to a thousand years ago by scraping away desert varnish coatings have not been covered by the re-establishment of the desert varnish. In Egypt desert varnish is barely perceptible on pyramids that have existed for 5,000 years since construction.

In desert areas man's activities, such as the construction of dams, roads, preparation of sites for construction and other activities of a like nature have exposed large, unsightly areas of lightly colored glaring scarps of freshly exposed rock which are visible from great distances as unsightly anomalies on the desert landscape. The removal of the natural desert varnish in this fashion occurs in both urban and rural areas and is particularly objectionable in the highly visible mountain areas; for example, where large cuts and fills are made to accommodate building sites.

Nature's timetable in restoring the desert varnish to the freshly exposed rock is much too long; therefore, a desire and need for a method and/or product to be used in restoring the natural desert varnish or covering the exposed areas with articles of manufacture simulating desert varnish coated natural rock constitutes a long-standing, unfulfilled need.

BRIEF DESCRIPTION OF THE INVENTION

Briefly, the present invention provides as compositions of matter a suitable rock substrate having a coating of the reaction product of a soluble basic salt, suitably an alkali, preferably sodium hydroxide and potassium hydroxide, and a soluble metallic salt, suitably a soluble salt of manganese or iron, preferably manganese chloride, manganese nitrate, iron chloride, or iron sulfate (the hydrates thereof are intended to be included). In its broader aspect, the composition of the coating may contain a ratio of such basic to metallic salts between about 1:80 to about 100:1. A preferred ratio of basic to metallic salts in the composition of the coating is about 1:1.

In another aspect, the invention is the method of producing an article of manufacture which simulates natural desert varnish on a suitable rock substrate which embraces the steps of applying to the rock, in order:

(1) An effective amount of a solution of soluble basic salts, e.g., alkali salts such as sodium hydroxide and potassium hydroxide, and (2) An effective amount of a solution of soluble metallic salts of iron or manganese, preferably manganese chloride, manganese nitrate, iron chloride and iron sulfate and, in an alternative embodiment, the application of the soluble metallic salts may be followed by an application of an effective amount of sodium hypochlorite.

The concentrations of alkali and metallic salts solutions may be from about 0.05N to about 5N and from about 0.05N to about 4N, respectively, and the ratios of alkali to metallic salts solutions range from about 1:80 to about 100:1; the preferred ratio being about 1:1.

The process may be effectively practiced by applying the alkali and metallic salts solutions to the rock substrate at a coverage rate of about 0.5 cc per square foot to about 25 cc per square foot, a preferred rate of application being 6 cc per square foot. The upper limit may be extended for porous rock types to 100 cc per square foot.

An additional step which in some instances proves effective, is the application of a solution of sodium hypochlorite which may be from about 0.05N to about 5N, preferably from about 0.5N to about 1.5N, and most preferred about 0.75N, in a ratio to the metallic salts of about 1:1 with a coverage of about 6 cc per square foot.

A suitable rock substrate treated according to the teachings of this invention may be expected to develop initial color in about one day, full color in about one week, and a patina resembling closely the ancient, natural desert varnish, in about six to seven months.

DETAILED DESCRIPTION OF THE PREFERRED EMBODIMENTS

Further understanding of the invention may be gained from a consideration of the following examples and comments:

EXAMPLE I

Approximately fifty square feet of freshly exposed (no desert varnish formed since disturbed) granite rock was treated according to the teachings of this invention as follows: The test area was sprayed with a 1N solution of KOH by means of a portable hand-pressurized garden sprayer. The coverage was approximately 6 cc per square foot. Within five to ten minutes after the initial application of KOH solution a 1N solution of $MnCl_2$ was applied at the rate of 6 cc per square foot.

An intense black coating resulted from the treatment in one week. Within seven months after the treatment a dull, greasy patina resembling naturally occurring desert varnish developed on the treated site.

EXAMPLE II

The protocol of Example I was followed on approximately fifty square feet of freshly exposed granite rock with the additional step of treating the test area with an application of 1N $FeCl_2$ within five to ten minutes after the application of the 1N manganese chloride.

A black coating with brown highlights resulted from the treatment. Within seven months after the treatment a dull, greasy patina resembling naturally occurring desert varnish developed on the treated site.

EXAMPLE III

Approximately two hundred fifty square feet of freshly exposed schist situated as a vertical scar on a mountain side was treated according to the teachings of this invention as follows:

The test area was sprayed with a 1N solution of potassium hydroxide by means of a portable pressurized garden sprayer. Within minutes after the first application of potassium hydroxide an application of one normal $MnCl_2$ was made. Both applications were applied at the rate of 6 cc per square foot.

The site was examined periodically and it was noted that a patina resembling that of naturally occurring desert varnish developed within seven months after the treatment. No bleeding or transportation of the staining has since occurred.

EXAMPLE IV

Approximately one thousand square feed of schist (with pronounced white talc deposits) disposed as a vertical scar on a mountain side, were treated according to the teachings of this invention as follows:

A solution of one normal KOH was applied at the rate of 6 cc per square foot. Within twenty minutes after the first application a one normal solution of $Mn(NO_3)_2$ was applied to the area at the rate of 6 cc per square foot. Thereafter, within thirty minutes of the second application one hundred square feet of the area was treated with an additional application of one normal solution of $Fe_2(SO_4)_3$ at the rate of 6 cc per square foot.

The result was an intense black coating over the treated area except where treated with $Fe_2(SO_4)_3$ which resulted in brown highlighting.

EXAMPLE V

Approximately three hundred square feet of schist was treated with a one normal solution of potassium hydroxide followed by a 0.5 normal solution of $Mn(NO_3)_2$ applied within thirty minutes after the application of the KOH according to the protocol of Example I.

The application resulted in a pleasing black coating which closely matched the surrounding rock.

EXAMPLE VI

Approximately ten thousand square feet of phyllite was treated according to the teachings of this invention as follows:

A one normal solution of KOH followed by $Mn(NO_3)_2$ solution, approximately 0.25N to 0.5N was applied to the test area at varying times between fifteen minutes and two days at a rate of approximately 6 cc per square foot. Approximately one week after the second application, a one normal solution of $Fe(SO_4)_3$ was applied to random sites in the test area.

The result was a variegated black coating with golden brown highlights in $Fe_2(SO_4)_3$ treated areas. One day after the completion of the process almost an inch of rain fell on the test site, but no bleeding of stain occurred.

EXAMPLE VII

Approximately nine hundred square feet of phyllite rock was treated according to the teachings of this invention, as follows:

A 1N solution of KOH was applied to the substrate at the rate of 6 cc per square foot, followed by an application of 1N manganese nitrate applied at the rate of approximately 3 cc per square foot.

Within 45 minutes after the application of $MnNO_3$ a 1N solution of $Fe_2(SO_4)_3$ was applied at the rate of approximately 3 cc per square foot. The resulting color was predominately reddish-brown with variegated black coloration.

EXAMPLE VIII

Approximately two hundred square feet of phyllite substrate was treated according to the teachings of this invention as follows:

A 1N KOH solution was applied to the substrate with a coverage of approximately 6 cc per square foot. Within 15 minutes an application of 1N $(Mn(NO_3)_2)$ to the substrate was made with a coverage of approximately 10 cc per square foot, resulting in intense black coloration.

In all of the examples above, color began to develop within twenty-four hours after completion of treatment and reached full intensity within seven days. In each case a patina developed, presenting an appearance almost indistinguishable from natural desert varnish, in about seventh months after the treatment.

The process of this invention has been found effective on a variety of igneous, metamorphic and sedimentary rocks including: basalt, andesite, rhyolite, diorite, gabbro, metarhyolite, quartzite, phyllite, schist, gneiss, hornfels, sandstone, conglomerate, graywacke, chert and impure carbonates. On the other hand, readily soluble and unstable rock such as pure limestone and dolomites will not maintain the surface. Friable sedimentary rocks and unstable slopes will take, but not support, the coatings due to abrasion from movement and dislocation.

The initial application of the alkali should be a concentration of at least about 0.1N, and the practical maximum is 5N. A preferred range of concentrations of the alkali solution is from 0.05N to 5N.

Good results are obtained with ratios of alkali to manganese salts and iron from about 1:10 to about 20:1. A preferred range of ratios is from about 1:2 to about 5:1 and the most preferred is a 1:1 ratio.

Preferred alkalis are KOH and NaOH; the preferred manganese salts are the chlorides and nitrates, and the preferred iron salts are the chlorides and sulfates.

The use of manganese concentrations of about 0.05N furnish barely perceptible black staining, whereas at the other extreme manganese concentrations about 4N to 5N produce intensely colored black.

1N solutions of both base and manganese applied in a 1:1 ratio provide a black intense equal to the most intense black normally found in natural desert varnish.

Similar concentrations of iron salts produce reddish hues.

Although the inventor does not wish to be bound by the theory, it is thought that the application of the alkali followed by the manganese or iron salt oxidizes the metallic salt which is further oxidized very quickly be exposure to air. The chemical reaction which occurs probably may be represented as follows:

$$Mn(NO_3)_2 \cdot xH_2O + H_2O + KOH \rightleftharpoons Mn(OH)_2 \text{ (brownish white ppt)}$$

$$Mn(OH)_2 \xrightarrow{O_2 \text{ air}} MnO_2 \text{ (black oxide ppt.)}$$

$$2Mn^{+3} + 2H_2O \rightleftharpoons Mn^{++} + MnO_2 + 4H^+ \text{ (black oxide ppt)}$$

$$FeCl_2 + OH \rightleftharpoons Fe(OH)_2 \text{ (white ppt)}$$

$$Fe(OH)_2 + H_2O \xrightarrow{\text{air } O_2} Fe_2O_3 \cdot xH_2O \text{ (golden brown/rusty ppt)}$$

In a limited application, soluble alkali and manganese salts may be mixed at concentrations of 0.1N or less and sprayed on together. The result is less satisfactory than using higher concentrations seriatim.

The time limitations between applications of alkali and manganese salts appears to be limited only by factors that remove the alkali, e.g., rain.

The application of sodium hypochlorite following the application of a metallic salt solution in the process described herein will speed up the process significantly. However, if both manganese and iron salts are present, only the iron precipitate and no manganese precipitant is formed.

A number of specific examples of the preferred embodiments of the practice of this invention has been set forth above, and from the teachings of this disclosure persons ordinarily skilled in the art will appreciate that other and different embodiments may be devised without undue experimentation, all of which are within the spirit and scope of this disclosure and the invention covered thereby. For example, although the preferred embodiment of the process at present contemplates the application of the chemicals to the substrate by spraying, other methods of applying the chemicals may be used, such as, brushing, dipping, and the like.

All such equivalent variations and modifications are intended to be included within the scope of this invention as exemplified by the appended claims.

What is claimed is:

1. A composition of matter comprising a stable, insoluble rock substrate having a coating applied to a scarred surface thereof, said coating comprising an initial layer of the reaction product of said rock with a 0.05N to 5N solution of alkali bases and a finishing cover comprising the reaction product of said initial layer with a 0.05N to 4N solution of metallic salts selected from the salts of iron and manganese.

2. The composition of claim 1 wherein said alkali bases are selected from NaOH and KOH, and said metallic salts are selected from $MnCl_2$, $Mn(NO_3)_2$, $FeCl_2$ and $Fe_2(SO_4)_3$.

3. The composition of claim 1 wherein the ratio, by weight, of alkali to metallic salts is about 1:80 to about 100:1.

4. The composition of claim 1 wherein the ratio of alkali to metallic salts is about 1:1.

5. The composition of claim 1 including a covering layer of sodium hypochlorite.

6. The composition of claim 1 wherein the concentrations of the alkali and metallic salt solutions are from about 0.5N to 1N each.

7. The composition of claim 1 wherein the concentration of the alkali solution is about 1N and the concentration of the metallic salt solution is about 1N.

8. The composition of claim 1 wherein the ratio, by weight, of alkali to metallic salts is about 1:16 to about 30:1.

* * * * *